(12) United States Patent
Peterson et al.

(10) Patent No.: US 12,274,199 B2
(45) Date of Patent: Apr. 15, 2025

(54) AGRICULTURAL PLANTER INCLUDING ADJUSTABLE ROW CLEANERS

(71) Applicant: Deere & Company, Moline, IL (US)

(72) Inventors: James R. Peterson, Annawan, IL (US); Nathan A. Mariman, Davenport, IA (US)

(73) Assignee: Deere & Company, Moline, IL (US)

( * ) Notice: Subject to any disclaimer, the term of this patent is extended or adjusted under 35 U.S.C. 154(b) by 286 days.

(21) Appl. No.: 17/833,673

(22) Filed: Jun. 6, 2022

(65) Prior Publication Data

US 2022/0369530 A1 Nov. 24, 2022

Related U.S. Application Data

(63) Continuation of application No. 16/130,718, filed on Sep. 13, 2018, now Pat. No. 11,350,554.

(51) Int. Cl.
*A01C 7/00* (2006.01)

(52) U.S. Cl.
CPC .................................. *A01C 7/006* (2013.01)

(58) Field of Classification Search
CPC ................................ A01B 35/16; A01C 7/006
See application file for complete search history.

(56) References Cited

U.S. PATENT DOCUMENTS

| | | | |
|---|---|---|---|
| 4,781,129 A * | 11/1988 | Swanson | A01C 5/064 172/603 |
| 5,255,617 A | 10/1993 | Williams et al. | |
| 5,657,707 A | 8/1997 | Dresher et al. | |
| 5,878,678 A | 3/1999 | Stephens et al. | |
| 6,761,120 B2 | 7/2004 | Kovach et al. | |
| 6,871,709 B2 | 3/2005 | Knobloch et al. | |
| 7,861,660 B2 | 1/2011 | Martin | |
| 8,151,717 B2 | 4/2012 | Bassett | |
| 8,381,827 B2 | 2/2013 | Gray et al. | |
| 8,393,407 B2 | 3/2013 | Freed | |

(Continued)

FOREIGN PATENT DOCUMENTS

| | | |
|---|---|---|
| EP | 0894426 A1 | 2/1999 |
| EP | 2524587 A1 | 11/2012 |

OTHER PUBLICATIONS

Extended European Search Report issued in European Application No. 19195393.4 dated Feb. 4, 2020 (10 pages).

*Primary Examiner* — Alicia Torres
(74) *Attorney, Agent, or Firm* — Michael Best & Friedrich LLP

(57) ABSTRACT

An adjustment assembly for an agricultural planter operable in a travel direction and at a travel velocity and configured to dispense seeds into a furrow formed within an agricultural surface includes a bracket configured to be coupled to a frame of the agricultural planter and a debris cleaner coupled to the bracket and configured to inhibit debris from entering the furrow. A control processor is configured to receive a first signal representing a first velocity of the agricultural planter relative to the agricultural surface, send a second signal to actuate movement of the debris cleaner into a first position based on the first signal, receive a third signal representing a second velocity of the agricultural planter relative to the agricultural surface, and send a fourth signal to actuate movement of the debris cleaner into a second position based on the third signal.

20 Claims, 7 Drawing Sheets

(56) References Cited

U.S. PATENT DOCUMENTS

| | | | |
|---|---|---|---|
| 8,408,149 B2* | 4/2013 | Rylander | A01B 63/32 |
| | | | 340/936 |
| 8,631,879 B1 | 1/2014 | Martin | |
| 8,985,232 B2* | 3/2015 | Bassett | A01B 63/111 |
| | | | 111/163 |
| 2010/0000451 A1 | 1/2010 | Martin et al. | |
| 2013/0228107 A1 | 9/2013 | Martin | |
| 2016/0066497 A1 | 3/2016 | Whalen | |
| 2019/0297769 A1 | 10/2019 | Zielke et al. | |

* cited by examiner

AGRICULTURAL PLANTER INCLUDING ADJUSTABLE ROW CLEANERS

The present continuation application claims benefit of U.S. Non-provisional patent application Ser. No. 16/130,718 filed Sep. 13, 2018, the entire contents of which are incorporated herein by reference.

BACKGROUND

The present disclosure relates to an agricultural planter, and more particularly to row cleaners of the agricultural planter that inhibit debris from entering furrows formed by the agricultural planter.

SUMMARY

In one aspect, an agricultural planter is operable in a travel direction and a travel velocity and configured to dispense seeds into a furrow formed within an agricultural surface. An adjustment assembly is for the agricultural planter and includes a bracket configured to be coupled to a frame of the agricultural planter and a debris cleaner coupled to the bracket. The debris cleaner is configured such that during operation of the agricultural planter the debris cleaner has, relative to the travel direction, a leading edge and a trailing edge. The debris cleaner is movable such that a distance between the leading and trailing edges in the travel direction is adjustable.

In another aspect, an agricultural planter is operable in a travel direction and configured to dispense seeds into a furrow formed within an agricultural surface. The furrow has a longitudinal axis and a width in a lateral direction perpendicular to the longitudinal axis. An adjustment assembly is for the agricultural planter and includes a bracket configured to be coupled to a frame of the agricultural planter, a first debris cleaner coupled to the bracket and configured such that during operation of the agricultural planter the first debris cleaner has, relative to the travel direction, a trailing edge, and a second debris cleaner coupled to the bracket and configured such that during operation of the agricultural planter the second debris cleaner has, relative to the travel direction, a trailing edge. During operation a distance between the trailing edges of the first and second debris cleaners in the lateral direction is adjustable.

In yet another aspect, an agricultural planter is operable in a travel direction and configured to dispense seeds into a furrow formed within an agricultural surface. An adjustment assembly is for the agricultural planter and includes a bracket configured to be coupled to a frame of the agricultural planter and a debris cleaner coupled to the bracket. The debris cleaner is configured to inhibit debris from entering the furrow. The adjustment assembly also includes a control processor configured to receive a first signal representing a first velocity of the agricultural planter relative to the agricultural surface, send a second signal to actuate movement of the debris cleaner into a first position based on the first signal, receive a third signal representing a second velocity of the agricultural planter relative to the agricultural surface, and send a fourth signal to actuate movement of the debris cleaner into a second position based on the third signal.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
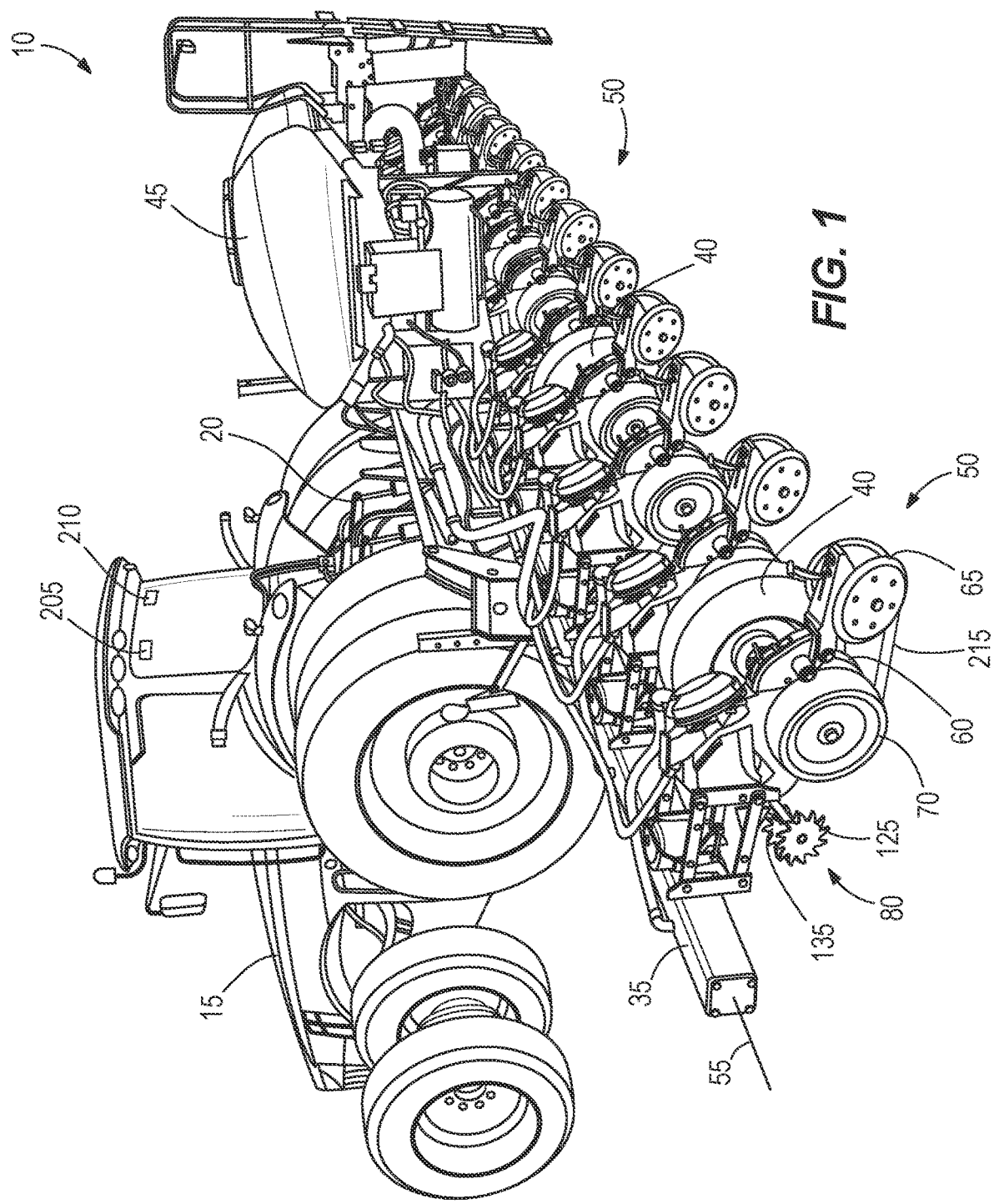
FIG. 1 is a perspective view of an agricultural planter coupled to a vehicle.
Figure 2:
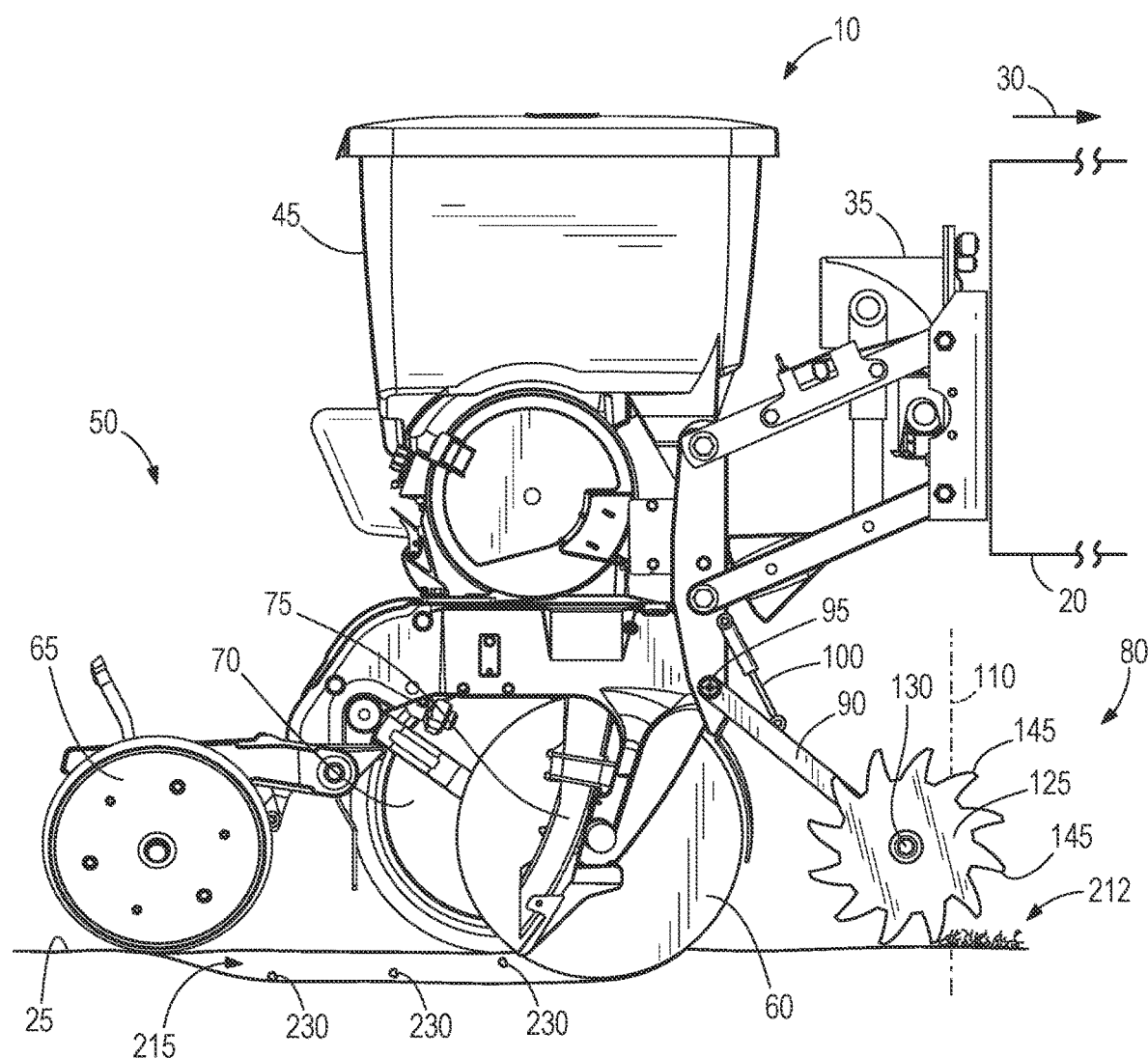
FIG. 2 is a side view of the agricultural planter of FIG. 1.

FIG. 1 illustrates an agricultural planter 10 coupled to a vehicle (e.g., a tractor 15). In particular, the illustrated planter 10 is selectively coupled to a hitch 20 of the tractor 15 for the tractor 15 to pull the planter 10 across an agricultural surface 25 (FIG. 2) in a direction of travel 30. The illustrated planter 10 includes a frame 35, wheels 40 coupled to the frame 35 to support the planter 10 above the surface 25, a holding tank 45 configured to support agricultural seeds (e.g., corn seeds, bean seeds, etc.), and a plurality of planting units 50 coupled to the frame 35 with each planting unit 50 equally spaced along a longitudinal axis 55 of the frame 35 relative to an adjacent planting unit 50. Each planting unit 50 is also in communication with the holding tank 45. As best shown in FIG. 2, each planting unit 50 includes a furrow opener 60, at least one furrow closer 65 positioned rearward the furrow opener 60 in the direction of travel 30, a depth member 70, a dispenser 75 in communication with the holding tank 45, and an adjustable row cleaner assembly 80 positioned forward the furrow opener 60 in the direction of travel 30. In some embodiments, the furrow opener 60 can be a blade, a wheel, a disc, etc. that is either rotatably or fixedly coupled to the frame 35, and/or the furrow closer 65 can be a blade, a wheel, a disc, etc. that is either rotatably or fixedly coupled to the frame 35.

Figure 3:
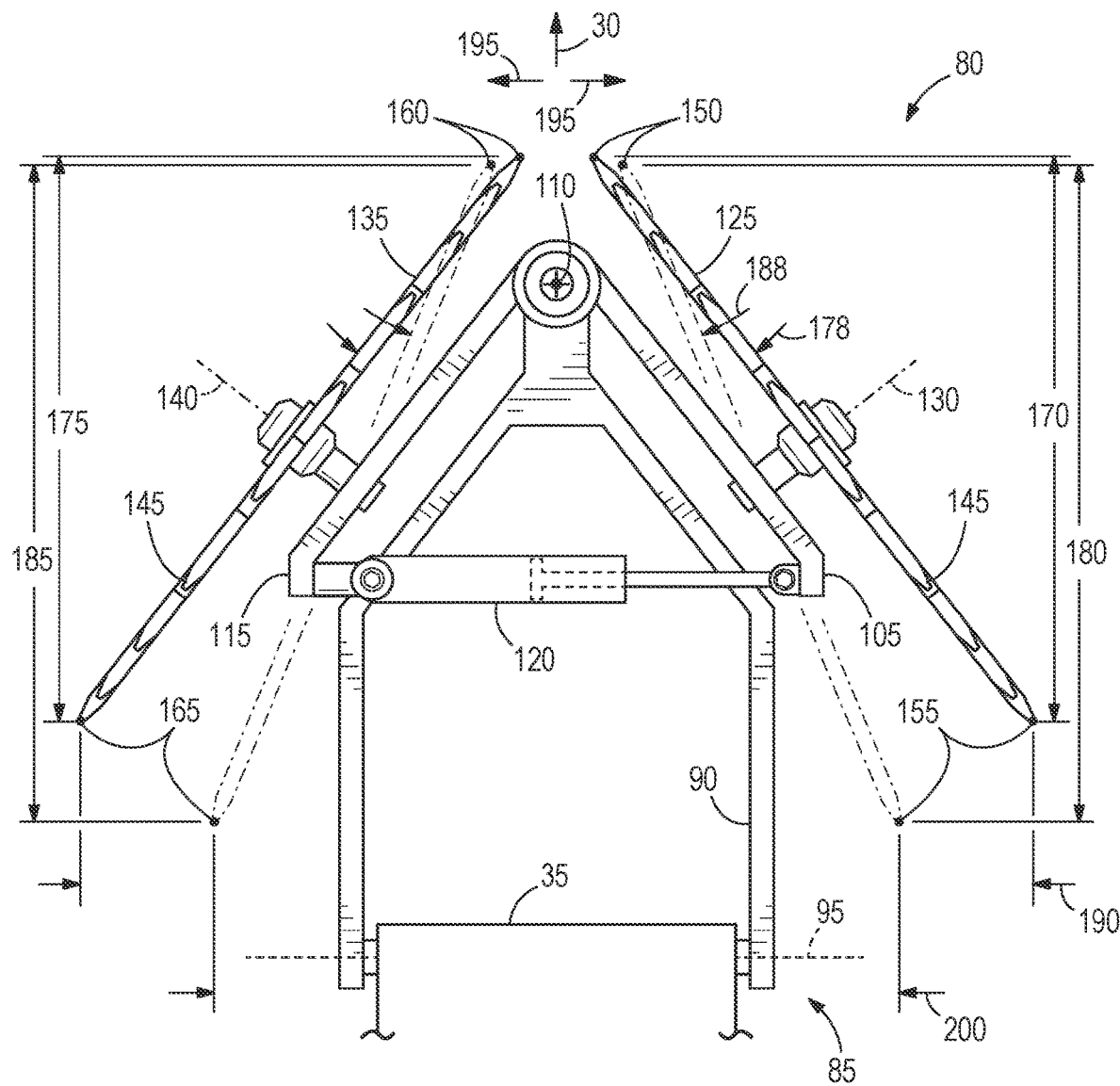
FIG. 3 is a top view of an adjustable row cleaner assembly of the agricultural planter of FIG. 2 according to an embodiment of the disclosure.

Each adjustable row cleaner assembly 80 is constructed in a similar manner such that one adjustable row cleaner assembly 80 is discussed in detail below but is applicable to the other adjustable row cleaner assemblies 80. With reference to FIG. 3, the adjustable row cleaner assembly 80 includes a bracket 85 having a first linkage 90 pivotably coupled to the frame 35 about a bracket axis 95. A bracket actuator 100 (e.g., a hydraulic cylinder; FIG. 2) is coupled to the first linkage 90 and the frame 35 and operable to pivot the bracket 85 about the bracket axis 95. In other embodiments, the bracket 85 can be fixedly coupled to the frame 35 such that the bracket actuator 100 can be omitted. With continued reference to FIG. 3, the illustrated bracket 85 also includes a second linkage 105 pivotably coupled to the first linkage 90 about a vertical pivot axis 110, which is substantially transverse to the surface 25, and a third linkage 115 that is also pivotably coupled to the first linkage 90 about the vertical pivot axis 110. A linkage actuator 120 (e.g., a hydraulic cylinder) is coupled to distal ends—relative to the vertical pivot axis 110—of the second and third linkages 105, 115 and operable to pivot the second and third linkages 105,115 about the vertical pivot axis 110. In the illustrated embodiment, actuation of the linkage actuator 120 moves the second and third linkages 105, 115 an equal amount about the vertical pivot axis 110. For example, an angle between the second linkage 105 and the direction of travel 30 is substantially the same as an angle between the third linkage 115 and the direction of travel 30 (in the reference frame of FIG. 3). In other embodiments, the linkage actuator 120 can move the second linkage 105 about the vertical pivot axis 110 a different amount than the third linkage 115.

The illustrated adjustable row cleaner assembly 80 also includes a first debris cleaner 125 rotatably coupled to the second linkage 105 about a first rotational axis 130 and a second debris cleaner 135 rotatably coupled to the third linkage 115 about a second rotational axis 140. In the illustrated embodiment, the first and second debris cleaners 125, 135 each include teeth 145 operable to contact the surface 25 (FIG. 2). The illustrated first and second debris cleaners 125, 135 are substantially planar wheels with the first and second rotational axes 130, 140 oriented parallel to the surface 25. In other embodiments, the first and second debris cleaners 125, 135 can be tilted such that the first and second rotational axes 130, 140 can be obliquely angled relative to the surface 25. In further embodiments, the first and/or second debris cleaners 125, 135 can be fixedly coupled to the bracket 85.

With continued reference to FIG. 3, the first debris cleaner 125 includes a leading edge 150 and a trailing edge 155 in the direction of travel 30. In particular, the leading edge 150 is a distal forward point on a perimeter of the first debris cleaner 125 in the direction of travel 30, and the trailing edge 155 is a distal rearward point on the perimeter of the first debris cleaner 125 in the direction of travel 30. Likewise, the second debris cleaner 135 includes a leading edge 160 and a trailing edge 165 in the direction of travel 30. In particular, the leading edge 160 is a distal forward point on a perimeter of the second debris cleaner 135 in the direction of travel 30, and the trailing edge 165 is a distal rearward point on the perimeter of the second debris cleaner 135 in the direction of travel 30. By actuating the linkage actuator 120, the first debris cleaner 125 and the second debris cleaner 135 are positionable relative to the first linkage 90 in at least two positions. In a first position of the debris cleaners 125, 135 (illustrated in solid lines in FIG. 3), a first distance 170—measured parallel to the direction of travel 30—is defined between the leading edge 150 and the trailing edge 155 of the first debris cleaner 125, and a second distance 175—measured parallel to the direction of travel 30—is defined between the leading edge 160 and the trailing edge 165 of the second debris cleaner 135. As the linkage actuator 120 is configured to move the first and second debris cleaners 125, 135 the same amount about the vertical pivot axis 110, the first distance 170 is substantially the same as the second distance 175. In the illustrated embodiment, a first angle 178 between the first and second debris cleaners 125, 135 when in the first position can be between about 60 degrees and about 50 degrees. In other embodiments, the first angle 178 can be greater than about 45 degrees but less than about 70 degrees.

In a second position of the debris cleaners 125, 135 (illustrated in broken lines in FIG. 3), a third distance 180—measured parallel to the direction of travel 30—is defined between the leading edge 150 and the trailing edge 155 of the first debris cleaner 125, and a fourth distance 185—measured parallel to the direction of travel 30—is defined between the leading edge 160 and the trailing edge 165 of the second debris cleaner 135. Again, as the linkage actuator 120 is configured to move the first and second debris cleaners 125, 135 the same amount about the vertical pivot axis 110, the third distance 180 is substantially the same as the fourth distance 185. In addition, the third and fourth distances 180, 185 are greater than the first and second distances 170, 175. In the illustrated embodiment, a second angle 188 between the first and second debris cleaners 125, 135 when in the second position can be between about 40 degrees and about 30 degrees. In other embodiments, the second angle 188 can be greater than about 20 degrees but less than about 45 degrees.

Also, when the first and second debris cleaners 125, 135 are in the first position (illustrated in solid lines in FIG. 3), a fifth distance 190—measured in one of two lateral directions 195 perpendicular to the direction of travel 30—is defined between the trailing edges 155, 165 of the first and second debris cleaners 125, 135. When the first and second debris cleaners 125, 135 are in the second position (illustrated in broken lines in FIG. 3), a sixth distance 200—measured in one of the two lateral directions 195—is defined between the trailing edges 155, 165 of the first and second debris cleaners 125, 135. In the illustrated embodiment, the fifth distance 190 is greater than the sixth distance 200.

Figure 4:
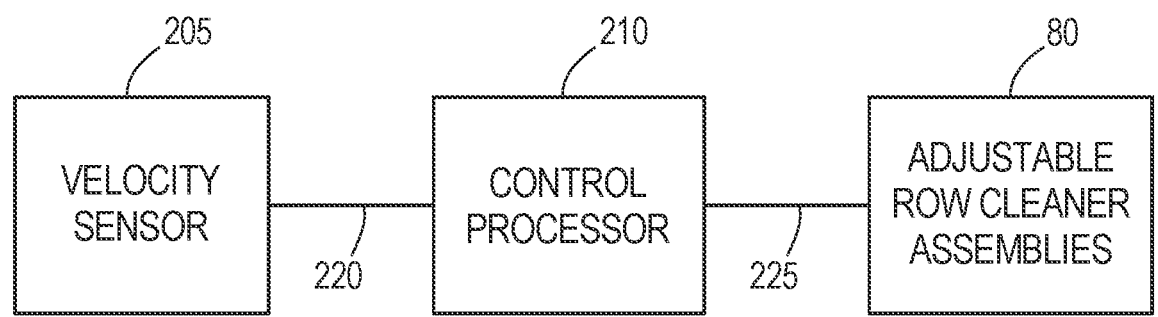
FIG. 4 illustrates a control processor in communication with the adjustable row cleaner assembly.

During operation, the tractor 15 pulls the planter 10 across the surface 25 at a particular velocity. The velocity of the tractor 15/planter 10 is measured by a velocity sensor 205 (e.g., a global positioning system or the like), which is in communication with a control processor 210 (FIG. 4). In some embodiments, the tractor 15 or the planter 10 can include the velocity sensor 205, and the tractor 15 or the planter 10 can include the control processor 210. With continued reference to FIG. 4, the control processor 210 is also in communication with each of the adjustable row cleaner assemblies 80. In particular, the control processor 210 is in communication with the bracket actuator 100 of each assembly 80 to control pivoting movement of the brackets 85 about their bracket axis 95 and is also in communication with the linkage actuator 120 of each assembly 80 to control movement of the first and second debris cleaners 125, 135 about their vertical pivot axis 110.

As all of the adjustable row cleaner assemblies 80 operate in a similar manner, only operation of one adjustable row cleaner assembly 80 is discussed below. With reference back to FIG. 2, as the tractor 15 pulls the planter 10 across the surface 25, the adjustable row cleaner assembly 80 is positioned vertically by the bracket actuator 100 such that the teeth 145 of the first and second debris cleaners 125, 135 contact the surface 25. Such contact with the surface 25 moves the first and second debris cleaners 125, 135 about their respective rotational axes 130, 140 as the planter 10 moves along the surface 25. Accordingly, the first and second debris cleaners 125, 135 push debris 212 (e.g., residue vegetation on the surface 25) in the lateral directions 195. This allows a clean surface for the furrow opener 60 to dig into the surface 25 to form a furrow 215 (FIG. 2). Stated another way, each first and second debris cleaner 125, 135 moves the debris 212 in one of the two lateral directions 195 to inhibit the debris 212 from entering the furrow 215.

However, as the planter 10 increases in velocity across the surface 25, the debris cleaners 125, 135 of one adjustable row cleaner assembly 80 could push the surface debris 212 too far in the lateral directions 195 potentially causing some surface debris 212 to enter a furrow 215 formed by an adjacent adjustable row cleaner assembly 80. Therefore, in the illustrated embodiment, the control processor 210 controls the position of the debris cleaners 125, 135 dependent upon the velocity of the planter 10/tractor 15 to inhibit the debris cleaners 125, 135 from pushing surface debris 212 too far into an adjacent furrow 215. Stated another way, the control processor 210 receives a first signal 220 (FIG. 4) from the velocity sensor 205 that represents a velocity of the planter 10/tractor 15 and sends a second signal 225 to the adjustable row cleaner assembly 80 that represents a position of the debris cleaners 125, 135 based on the velocity of the planter 10/tractor 15. For example, as the planter 10 travels at a relatively slow velocity across the surface 25, the control processor 210 actuates the linkage actuator 120 to position the debris cleaners 125, 135 in the first position (illustrated in solid lines in FIG. 3). As such, the debris cleaners 125, 135 are positioned wider (e.g., the fifth distance 190 compared to the sixth distance 200) to push the surface debris 212 a sufficient amount in the lateral directions 195 (e.g., to position the surface debris 212 between adjacent furrows 215). In contrast, as the velocity of the planter 10 increases across the surface 25, the control processor 210 actuates the linkage actuator 120 to move the debris cleaners 125, 135 toward the second position (illustrated in broken lines in FIG. 3). As such, the debris cleaners 125, 135 are positioned narrower (e.g., the sixth distance 200 compared to the fifth distance 190) to push the surface debris 212 a sufficient amount in the lateral directions 195 (e.g., between adjacent furrows 215). Accordingly, the control processor 210 moves the position of the debris cleaners 125, 135 dependent upon the velocity of the planter 10/tractor 15 to ensure the surface debris 212 is moved enough in the lateral directions 195 as to not enter the furrow 215 formed by the corresponding furrow opener 60 and to also ensure the surface debris 212 isn't moved too far in the lateral directions 195 as to enter an adjacent furrow 215.

In addition, the control processor 210 is operable to change a downward force of the debris cleaners 125, 135 against the surface 25 dependent upon a velocity of the planter 10/tractor 15. Stated another way, the control processor 210 receives the first signal 220 from the velocity sensor 205 and sends the second signal 225 to the adjustable row cleaner assembly 80 that represents a downward force of the debris cleaners 125, 135 against the surface 25 based on the velocity of the planter 10/tractor 15. For example, the control processor 210 controls the bracket actuator 100 to move the debris cleaners 125, 135 away from the surface 25 as the velocity of the planter 10 decreases to decrease a force of the debris cleaners 125, 135 acting on the surface 25. In contrast, the control processor 210 controls the bracket actuator 100 to move the debris cleaners 125, 135 toward the surface 25 as the velocity of the planter 10 increases to increase a force of the debris cleaners 125, 135 acting on the surface 25. Accordingly, the debris cleaners 125, 135 push the surface debris 212 a desired amount in the lateral directions 195 dependent upon a velocity of the planter 10. The control processor 210 can also control the downward force of the debris cleaners 125, 135 on the surface 25 dependent upon a quantity of surface debris 212 on the surface 25. For example, as the quantity of surface debris 212 increases, the control processor 210 controls the bracket actuator 100 to move the debris cleaners 125, 135 toward the surface 25 to provide more force of the debris cleaners 125, 135 against the surface 25 to ensure the surface debris 212 is pushed a sufficient amount in the lateral directions 195. Accordingly, in some embodiments, a sensor can be in communication with the control processor 210 operable to measure a quantity of surface debris 212 on the surface 25. Stated another way, the control processor 210 receives a first signal from the sensor that represents a quantity of surface debris 212 and sends a second signal to the adjustable row cleaner assembly 80 that represents a downward force of the debris cleaners 125, 135 against the surface 25 based on the quantity of the surface debris 212. In further embodiments, the control processor 210 can receive two signals—one of which represents a velocity of the planter 10 and the other a quantity of surface debris 212—and sends a third signal to the adjustable row cleaner assembly 80 that represents a lateral position of the residue cleaners 125, 135 and/or a downward force of the residue cleaners 125, 135.

Once the furrow 215 is formed by the furrow opener 60, the dispenser 75 of the planter 10 incrementally drops seeds 230 from the holding tank 45 within the furrow 215 as the planter 10 moves across the surface 25. In particular, the furrow 215 defines a channel within the surface 25 having a longitudinal axis, which is parallel to the direction of travel 30, and a width perpendicular to the longitudinal axis (e.g., parallel to the lateral directions 195) of the furrow 215. The depth member 70 is also in communication with the control processor 210 and is operable to measure a depth of the furrow 215 such that the planter 10 can adjust the depth of the furrow 215. Furthermore, after the seeds 230 have been dispensed into the furrow 215, the illustrated furrow closer 65 then covers the seeds 230 within the furrow 215 so that the seeds 230 are encapsulated below the surface 25 and the seeds 230 can begin to grow.

Figure 5:
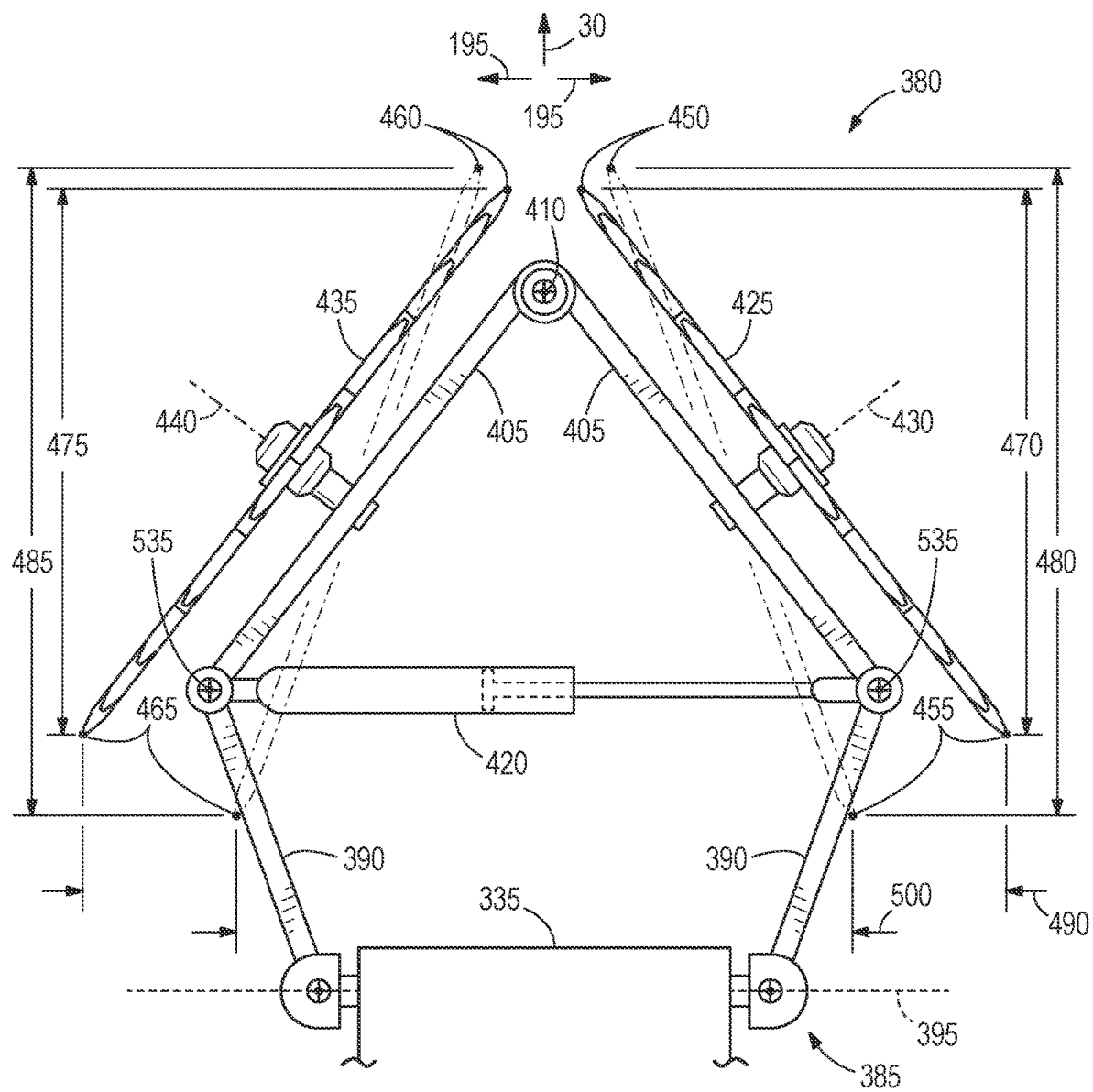
FIG. 5 is a top view of an adjustable row cleaner assembly according to another embodiment of the disclosure.

FIG. 5 illustrates an adjustable row cleaner assembly 380 according to another embodiment. The adjustable row cleaner assembly 380 is similar to the adjustable row cleaner assembly 80; therefore, similar components are designated with similar references numbers plus 300. At least some differences and/or at least some similarities between the adjustable row cleaner assemblies 80, 380 will be discussed in detail below. In addition, components or features described with respect to the adjustable row cleaner assembly 380 are equally applicable to the adjustable row cleaner assembly 80 described above.

The illustrated adjustable row cleaner assembly 380 includes a bracket 385 having a pair of first linkages 390 pivotably coupled to a frame 335 of the planter 10 about a bracket axis 395 and a pair of second linkages 405 pivotably coupled together about a vertical pivot axis 410. Each second linkage 405 is also pivotably coupled to one of the first linkages 390 about a joint 535. A linkage actuator 420 is coupled to the two joints 535 and is operable to move the joints 535 relative to each other in the lateral directions 195. In other embodiments, the linkage actuator 420 can be coupled to the pair of first linkages 390, the pair of second linkages 405, or one of the first linkages 390 and one of the second linkages 405 to move the joints 535 relative to each other. The illustrated linkage actuator 420 is in communication with the control processor 210.

A first debris cleaner 425 is rotatably coupled to one of the second linkages 405 about a first rotational axis 430, and a second debris cleaner 435 is rotatably coupled to the other second linkage 405 about a second rotational axis 440. The first debris cleaner 425 includes a leading edge 450 and a trailing edge 455 in the direction of travel 30. Likewise, the second debris cleaner 435 includes a leading edge 460 and a trailing edge 465 in the direction of travel 30.

In a first position of the debris cleaners 425, 435 (illustrated in solid lines in FIG. 5), a first distance 470 is defined between the leading edge 450 and the trailing edge 455 of the first debris cleaner 425, and a second distance 475—which is substantially the same as the first distance 470—is defined between the leading edge 460 and the trailing edge 465 of the second debris cleaner 435. In a second position of the debris cleaners 425, 435 (illustrated in broken lines in FIG. 5), a third distance 480 is defined between the leading edge 450 and the trailing edge 455 of the first debris cleaner 425, and a fourth distance 485—which is substantially the same as the third distance 480— is defined between the leading edge 460 and the trailing edge 465 of the second debris cleaner 435.

In addition, when the first and second debris cleaners 425, 435 are in the first position (illustrated in solid lines in FIG. 5), a fifth distance 490 is defined between the trailing edges 455, 465 of the first and second debris cleaners 425, 435, which is greater than a sixth distance 500 defined between the trailing edges 455, 465 of the first and second debris cleaners 425, 435 when the first and second debris cleaners 425, 435 are in the second position (illustrated in broken lines in FIG. 5).

Figure 6:
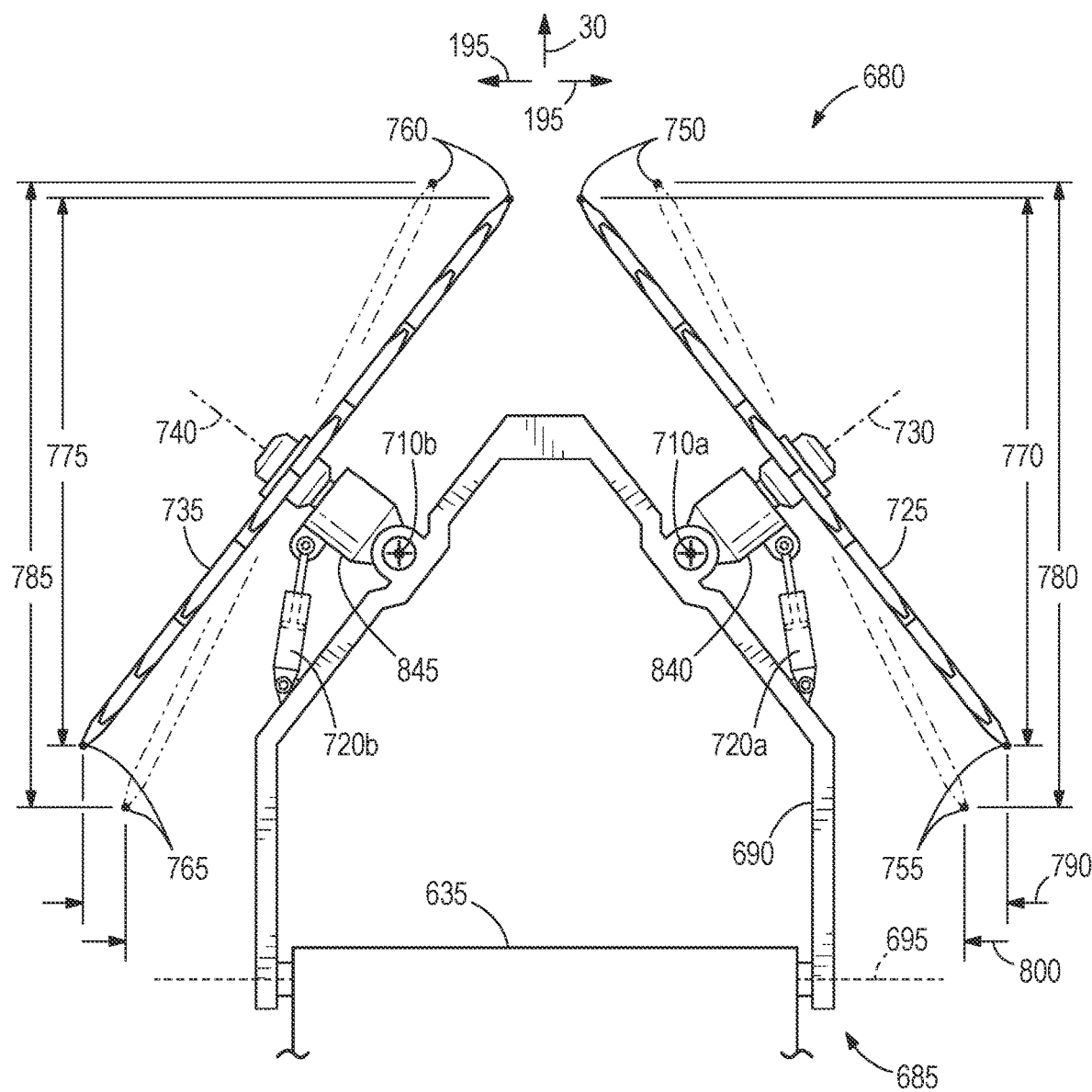
FIG. 6 is a top view of an adjustable row cleaner assembly according to another embodiment of the disclosure.

FIG. 6 illustrates an adjustable row cleaner assembly 680 according to another embodiment. The adjustable row cleaner assembly 680 is similar to the adjustable row cleaner assembly 80; therefore, similar components are designated with similar references numbers plus 600. At least some differences and/or at least some similarities between the adjustable row cleaner assemblies 80, 680 will be discussed in detail below. In addition, components or features described with respect to the adjustable row cleaner assembly 680 are equally applicable to the adjustable row cleaner assemblies 80, 380 described above.

The illustrated adjustable row cleaner assembly 680 includes a bracket 685 having a linkage 690 pivotably coupled to a frame 635 of the planter 10 about a bracket axis 695. The bracket 685 also includes a first hub 840 pivotably coupled to the linkage 690 about a first vertical pivot axis 710a, and a second hub 845 pivotably coupled to the linkage 690 about a second vertical pivot axis 710b. A first linkage actuator 720a is coupled to the linkage 690 and the first hub 840, and a second linkage actuator 720b is coupled to the linkage 690 and the second hub 845. Both the first and second linkage actuators 720a, 720b are in communication with the control processor 210 and are operable to move the corresponding hub 840, 845 about their vertical pivot axis 710a, 710b.

A first debris cleaner 725 is rotatably coupled to the first hub 840 about a first rotational axis 730, and a second debris cleaner 735 is rotatably coupled to the second hub 845 about a second rotational axis 740. The first debris cleaner 725 includes a leading edge 750 and a trailing edge 755 in the direction of travel 30. Likewise, the second debris cleaner 735 includes a leading edge 760 and a trailing edge 765 in the direction of travel 30.

In a first position of the debris cleaners 725, 735 (illustrated in solid lines in FIG. 6), a first distance 770 is defined between the leading edge 750 and the trailing edge 755 of the first debris cleaner 725, and a second distance 775—which is substantially the same as the first distance 770—is defined between the leading edge 760 and the trailing edge 765 of the second debris cleaner 735. In a second position of the debris cleaners 725, 735 (illustrated in broken lines in FIG. 6), a third distance 780 is defined between the leading edge 750 and the trailing edge 755 of the first debris cleaner 725, and a fourth distance 785—which is substantially the same as the third distance 780 is defined between the leading edge 760 and the trailing edge 765 of the second debris cleaner 735.

In addition, when the first and second debris cleaners 725, 735 are in the first position (illustrated in solid lines in FIG. 6), a fifth distance 790 is defined between the trailing edges 755, 765 of the first and second debris cleaners 725, 735, which is greater than a sixth distance 800 defined between the trailing edges 755, 765 of the first and second debris cleaners 725, 735 when the first and second debris cleaners 725, 735 are in the second position (illustrated in broken lines in FIG. 6).

Figure 7:
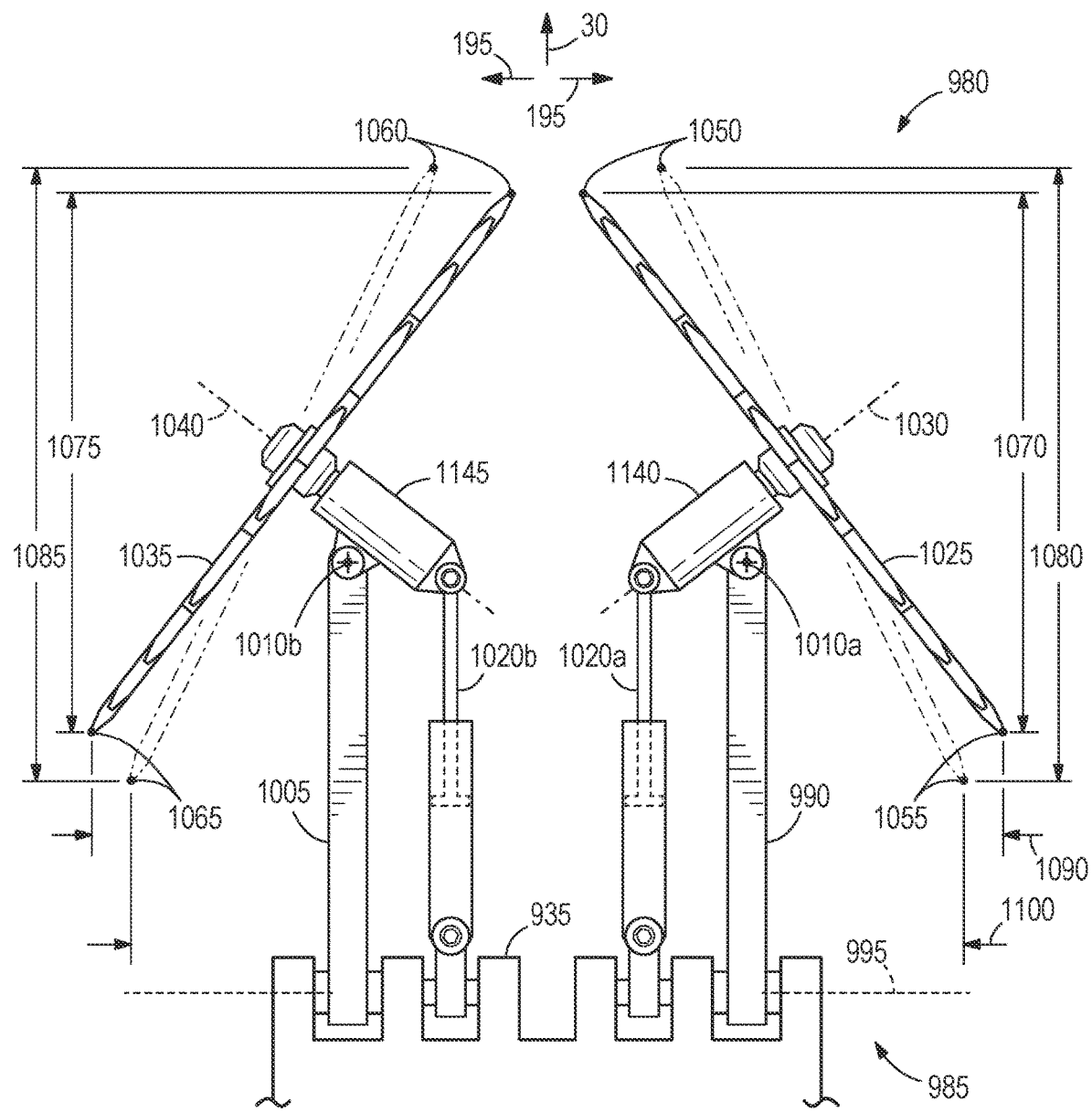
FIG. 7 is a top view of an adjustable row cleaner assembly according to another embodiment of the disclosure.

FIG. 7 illustrates an adjustable row cleaner assembly 980 according to another embodiment. The adjustable row cleaner assembly 980 is similar to the adjustable row cleaner assembly 80; therefore, similar components are designated with similar references numbers plus 900. At least some differences and/or at least some similarities between the adjustable row cleaner assemblies 80, 980 will be discussed in detail below. In addition, components or features described with respect to the adjustable row cleaner assembly 980 are equally applicable to the adjustable row cleaner assemblies 80, 380, 680 described above.

The illustrated adjustable row cleaner assembly 980 includes a bracket 985 having first and second linkages 990, 1005 pivotably coupled to a frame 935 of the planter 10 about a bracket axis 995. The bracket 985 also includes a first hub 1140 pivotably coupled to the first linkage 990 about a first vertical pivot axis 1010a, and a second hub 1145 pivotably coupled to the second linkage 1005 about a second vertical pivot axis 1010b. A first linkage actuator 1020a is coupled to the frame 935 and the first hub 1140, and a second linkage actuator 1020b is coupled to the frame 935 and the second hub 1145. Both the first and second linkage actuators 1020a, 1020b are in communication with the control processor 210 and are operable to move the corresponding hub 1140, 1145 about their vertical pivot axis 1010a, 1010b.

A first debris cleaner 1025 is rotatably coupled to the first hub 1140 about a first rotational axis 1030, and a second debris cleaner 1035 is rotatably coupled to the second hub 1145 about a second rotational axis 1040. The first debris cleaner 1025 includes a leading edge 1050 and a trailing edge 1055 in the direction of travel 30. Likewise, the second debris cleaner 1035 includes a leading edge 1060 and a trailing edge 1065 in the direction of travel 30.

In a first position of the debris cleaners 1025, 1035 (illustrated in solid lines in FIG. 7), a first distance 1070 is defined between the leading edge 1050 and the trailing edge 1055 of the first debris cleaner 1025, and a second distance 1075—which is substantially the same as the first distance 1070—is defined between the leading edge 1060 and the trailing edge 1065 of the second debris cleaner 1035. In a second position of the debris cleaners 1025, 1035 (illustrated in broken lines in FIG. 7), a third distance 1080 is defined between the leading edge 1050 and the trailing edge 1055 of the first debris cleaner 1025, and a fourth distance 1085—which is substantially the same as the third distance 1080—is defined between the leading edge 1060 and the trailing edge 1065 of the second debris cleaner 1035.

In addition, when the first and second debris cleaners 1025, 1035 are in the first position (illustrated in solid lines in FIG. 7), a fifth distance 1090 is defined between the trailing edges 1055, 1065 of the first and second debris cleaners 1025, 1035, which is greater than a sixth distance 1100 defined between the trailing edges 1055, 1065 of the first and second debris cleaners 1025, 1035 when the first and second debris cleaners 1025, 1035 are in the second position (illustrated in broken lines in FIG. 7).

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An adjustment assembly for an agricultural planter, the agricultural planter operable in a travel direction and at a travel velocity and configured to dispense seeds into a furrow formed within an agricultural surface, the adjustment assembly comprising:
  a bracket configured to be coupled to a frame of the agricultural planter;
  a debris cleaner coupled to the bracket, the debris cleaner configured to inhibit debris from entering the furrow; and
  a control processor configured to
    receive a first signal representing a first velocity of the agricultural planter relative to the agricultural surface,
    send a second signal to actuate movement of the debris cleaner into a first position based on the first signal,
    receive a third signal representing a second velocity of the agricultural planter relative to the agricultural surface, and
    send a fourth signal to actuate movement of the debris cleaner into a second position based on the third signal,
  wherein the debris cleaner is configured to be closer to the agricultural surface in the first position than in the second position.

2. The adjustment assembly of claim 1, wherein the debris cleaner is rotatably coupled to the bracket about a rotational axis.

3. The adjustment assembly of claim 1, wherein the debris cleaner is configured such that during operation of the agricultural planter, the debris cleaner has, relative to the travel direction, a leading edge and a trailing edge, and wherein the debris cleaner is movable to change a distance between the leading and trailing edges in the travel direction.

4. The adjustment assembly of claim 3, wherein the distance is configured to decrease in response to decreasing the travel velocity of the agricultural planter, and wherein the distance is configured to increase in response to increasing the travel velocity of the agricultural planter.

5. The adjustment assembly of claim 1, wherein the control processor is configured to move the debris cleaner away from the agricultural surface as the travel velocity of the agricultural planter decreases to decrease a force of the debris cleaner acting on the agricultural surface, and wherein the control processor is configured to move the debris cleaner toward the surface as the travel velocity of the agricultural planter increases to increase the force of the debris cleaner acting on the agricultural surface.

6. The adjustment assembly of claim 1, wherein a sensor operable to measure a quantity of surface debris on the agricultural surface is configured to communicate with the control processor.

7. The adjustment assembly of claim 6, wherein the control processor is configured to send signals to modify a lateral position of the debris cleaner and to modify a downward force of the debris cleaner.

8. An adjustment assembly for an agricultural planter, the agricultural planter operable in a travel direction and at a travel velocity and configured to dispense seeds into a furrow formed within an agricultural surface, the adjustment assembly comprising:
  a linkage configured to be coupled to a frame of the agricultural planter;
  a hub coupled to the linkage;
  a rotatable debris cleaner coupled to the hub and having an axis of rotation, the debris cleaner configured such that during operation of the agricultural planter, an acute angle is formed between the axis of rotation and the travel direction; and
  an actuator directly coupled to the hub and operable to change the angle in response to a change in the travel velocity.

9. The adjustment assembly of claim 8, wherein the actuator is directly coupled to the linkage.

10. The adjustment assembly of claim 9, wherein the hub is a first hub and is pivotably coupled to the linkage about a first pivot axis and wherein a second hub is pivotably coupled to the linkage about a second pivot axis.

11. The adjustment assembly of claim 8, wherein an end of the actuator is mounted to the hub at a point along the axis of rotation.

12. The adjustment assembly of claim 8, wherein the actuator is configured to be selectively extended such that extending the actuator reduces the angle.

13. The adjustment assembly of claim 8, wherein the first actuator is directly coupled to the frame of the agricultural planter.

14. The adjustment assembly of claim 13, wherein the actuator is configured to extend and retract in a direction parallel to the direction of travel.

15. The adjustment assembly of claim 14, wherein the debris cleaner is configured such that during operation of the agricultural planter, the debris cleaner has, relative to the travel direction, a leading edge, a trailing edge, and a distance in the travel direction therebetween, and wherein the actuator is configured such that extending the actuator increases the distance.

16. The adjustment assembly of claim 8, wherein the actuator is configured such that, while extending or retracting the actuator over a range of motion, the actuator is, at least at one point over the range of motion, parallel with the direction of travel.

17. An adjustment assembly for an agricultural planter, the agricultural planter operable in a travel direction and at a travel velocity and configured to dispense seeds into a furrow formed within an agricultural surface, the adjustment assembly comprising:
  a bracket configured to be coupled to a frame of the agricultural planter;
  a debris cleaner coupled to the bracket, the debris cleaner configured to inhibit debris from entering the furrow; and
  a control processor configured to
    receive a first signal representing a first velocity of the agricultural planter relative to the agricultural surface,
    send a second signal to actuate movement of the debris cleaner into a first position based on the first signal,
    receive a third signal representing a second velocity of the agricultural planter relative to the agricultural surface, and send a fourth signal to actuate movement of the debris cleaner into a second position based on the third signal, wherein the control processor is configured to move the debris cleaner away from the agricultural surface as the travel velocity of the agricultural planter decreases to decrease a force of the debris cleaner acting on the agricultural surface, and wherein the control processor is configured to move the debris cleaner toward the surface as the travel velocity of the agricultural planter increases to increase the force of the debris cleaner acting on the agricultural surface.

18. The adjustment assembly of claim 17, wherein the debris cleaner is configured such that during operation of the agricultural planter, the debris cleaner has, relative to the travel direction, a leading edge and a trailing edge, and wherein the debris cleaner is movable to change a distance between the leading and trailing edges in the travel direction.

19. The adjustment assembly of claim 17, wherein a sensor operable to measure a quantity of surface debris on the agricultural surface is configured to communicate with the control processor.

20. The adjustment assembly of claim 19, wherein the control processor is configured to send signals to modify a lateral position of the debris cleaner and to modify a downward force of the debris cleaner.

\* \* \* \* \*